United States Patent [19]
Shimizu et al.

[11] Patent Number: 5,482,020
[45] Date of Patent: Jan. 9, 1996

[54] CONTROL SYSTEM FOR INTERNAL COMBUSTION ENGINES

[75] Inventors: Daisuke Shimizu; Kotaro Miyashita; Yoshihisa Hara; Yamamoto Yoshio, all of Wako, Japan

[73] Assignee: Honda Giken Kogyo K.K., Tokyo, Japan

[21] Appl. No.: 322,086

[22] Filed: Oct. 12, 1994

[30] Foreign Application Priority Data

Oct. 19, 1993 [JP] Japan .................. 5-284369

[51] Int. Cl.⁶ .................. F02P 5/15; F02D 41/04; F02M 25/07
[52] U.S. Cl. .................. 123/417; 123/478; 123/571
[58] Field of Search .................. 123/416, 417, 123/478, 480, 486, 571

[56] References Cited

U.S. PATENT DOCUMENTS

| | | | |
|---|---|---|---|
| 4,314,540 | 2/1982 | Ikeura | 123/417 |
| 4,399,791 | 8/1983 | Kobayashi et al. | 123/571 |
| 4,409,948 | 10/1983 | Hasegawa et al. | 123/417 |
| 4,448,178 | 5/1984 | Yamato et al. | 123/571 |
| 4,454,853 | 6/1984 | Hasegawa | 123/480 |
| 4,598,684 | 7/1986 | Kato et al. | 123/478 |
| 4,848,303 | 7/1989 | Fujimoto et al. | 123/480 |
| 5,209,214 | 5/1993 | Ikuta et al. | 123/698 |
| 5,241,943 | 9/1993 | Miyashita et al. | 123/698 |

FOREIGN PATENT DOCUMENTS

| | | |
|---|---|---|
| 53032 | 3/1989 | Japan . |
| 2055961 | 3/1981 | United Kingdom . |

*Primary Examiner*—Willis R. Wolfe
*Attorney, Agent, or Firm*—Arthur L. Lessler

[57] ABSTRACT

A control system for an internal combustion engine includes an exhaust gas recirculation passage extending between the intake system and the exhaust system, for recirculating part of exhaust gases emitted from the engine, an EGR valve for controlling a flow rate of exhaust gases to be recirculated through the exhaust gas recirculation passage, and an ECU which detects an operating condition of the EGR valve, and calculates an amount of fuel to be injected, based on operating conditions of the engine. Further, the ECU calculates dynamic characteristics of the exhaust gases to be recirculated, based on operating conditions of the engine, a virtual operation amount of the EGR valve, based on the dynamic characteristics, a recirculation rate of exhaust gases, based on the virtual operation amount as well as operating conditions of the engine, and a recirculation rate of inert gases present in exhaust gases to be recirculated, based on the exhaust gas recirculation rate as well as the concentration of oxygen present in the exhaust gases, and corrects the amount of the fuel to be injected, based on the inert gas recirculation rate.

8 Claims, 11 Drawing Sheets

| | PBA1 | ... | PBAi | ... | PBA10 |
|---|---|---|---|---|---|
| NE1 | LMAX(1,1) | ... | LMAX(i,1) | ... | LMAX(10,1) |
| ... | ... | ... | ... | ... | ... |
| NEj | LMAX(1,j) | ... | LMAX(i,j) | ... | LMAX(10,j) |
| ... | ... | ... | ... | ... | ... |
| NE11 | LMAX(1,11) | ... | LMAX(i,11) | ... | LMAX(10,11) |

| | NE1 | ... | NEi | ... | NE20 |
|---|---|---|---|---|---|
| PBA1 | $\theta$ IGEMAX (1,1) | ... | $\theta$ IGEMAX (i,1) | ... | $\theta$ IGEMAX (20,1) |
| ... | ... | ... | ... | ... | ... |
| PBAj | $\theta$ IGEMAX (1,j) | ... | $\theta$ IGEMAX (i,j) | ... | $\theta$ IGEMAX (20,j) |
| ... | ... | ... | ... | ... | ... |
| PBA11 | $\theta$ IGEMAX (1,11) | ... | $\theta$ IGEMAX (i,11) | ... | $\theta$ IGEMAX (20,11) |

| LNE1 | PBA1 | KEGR(1,1) | ......... | KEGR(1,j) | ......... | KEGR(1,11) |
|---|---|---|---|---|---|---|
| ......... | ......... | ......... | | ......... | ......... | ......... |
| LNEj | PBAi | KEGR(i,1) | ......... | KEGR(i,j) | ......... | KEGR(i,11) |
| ......... | ......... | ......... | ......... | ......... | | ......... |
| LNE11 | PBA10 | KEGR(10,1) | ......... | KEGR(10,j) | ......... | KEGR(10,11) |

CONTROL SYSTEM FOR INTERNAL COMBUSTION ENGINES

BACKGROUND OF THE INVENTION

1. Field of the Invention

This invention relates to a control system for internal combustion engines, and more particularly to a control system which controls the fuel injection amount and the ignition timing in response to the flow rate of exhaust gases to be recirculated through an exhaust gas recirculation passage provided in the engine.

2. Prior Art

Conventionally, internal combustion engines are well known, which are provided with an exhaust gas recirculation passage for recirculating part of exhaust gases emitted from the engine to the intake system thereof, and an exhaust gas recirculation control valve for controlling the flow rate of exhaust gases to be recirculated through the exhaust gas recirculation passage, to thereby reduce NOx present in exhaust gases emitted from the engine. Further, there are known control systems for internal combustion engines of this type, for example, from Japanese Provisional Patent Publication (Kokai) No. 64-53032, which estimate the amount of exhaust gases to be recirculated and the amount of air to be drawn into the engine, from operating conditions of the engine, to thereby calculate the fuel injection amount, based on the estimated amounts.

However, the above prior art does not contemplate a so-called "dynamic delay" of exhaust gases to be recirculated to the engine, which is a time lag from the time the amount of exhaust gases to be recirculated is calculated to the time the calculated amount of exhaust gases is actually supplied to the engine. In particular, immediately after a change in the air-fuel ratio of an air-fuel mixture supplied to the engine from a rich state to a lean state or vice versa, the amount of exhaust gases to be recirculated through the exhaust gas recirculation passage cannot be accurately calculated, resulting in that air-fuel ratio control, fuel injection amount control, further ignition timing control, etc. cannot be carried out with high accuracy. In other words, according to the prior art, since no contemplation is made of the dynamic delay of exhaust gases to be recirculated, the degree of convergency of the air-fuel ratio to a desired valve is degraded immediately after a shift of the air-fuel ratio from a lean state to a rich state or vice versa, leading to degraded exhaust emission characteristics, or incapability of optimal control of the ignition timing, and hence degraded driveability of the engine.

SUMMARY OF THE INVENTION

It is the object of the invention to provide a control system for internal combustion engines, which is capable of more accurately controlling the fuel injection amount and the ignition timing by accurately calculating the amount of exhaust gases to be recirculated, with the dynamic delay of the exhaust gases taken into account.

To attain the above object, the present invention provides a control system for an internal combustion engine having an intake system, and an exhaust system, including an exhaust gas recirculation passage extending between the intake system and the exhaust system, for recirculating part of exhaust gases emitted from the engine, an exhaust gas recirculation control valve for controlling a flow rate of exhaust gases to be recirculated through the exhaust gas recirculation passage, valve operating condition-detecting means for detecting operating conditions of the exhaust gas recirculation control valve, exhaust gas concentration-detecting means for detecting concentration of oxygen present in the exhaust gases, engine operating condition-detecting means for detecting operating conditions of the engine including rotational speed of the engine and load on the engine, and fuel injection amount-calculating means for calculating an amount of fuel to be injected, based on operating conditions of the engine detected by the engine operating condition-detecting means.

The control system according to the invention is characterized by comprising:

dynamic characteristic-determining means for determining dynamic characteristics of the exhaust gases to be recirculated, based on operating conditions of the engine detected by the engine operating condition-detecting means;

virtual operation amount-calculating means for calculating a virtual operation amount of the exhaust gas recirculation control valve, based on the dynamic characteristics determined by the dynamic characteristic-determining means;

exhaust gas recirculation rate-calculating means for calculating a recirculation rate of the exhaust gases, based on the virtual operation amount calculated by the virtual operation amount-calculating means and operating conditions of the engine detected by the engine operating condition-detecting means;

inert gas recirculation rate-calculating means for calculating a recirculation rate of inert gases present in the exhaust gases to be recirculated through the exhaust gas recirculation passage, based on the exhaust gas recirculation rate calculated by the exhaust gas recirculation rate-calculating means and the concentration of oxygen present in the exhaust gases detected by the exhaust gas concentration-detecting means; and fuel injection amount-correcting means for correcting the amount of the fuel to be injected, based on the inert gas recirculation rate calculated by the inert gas recirculation rate-calculating means.

Preferably, the dynamic characteristic-determining means calculates a time lag coefficient indicative of the dynamic characteristics of the exhaust gases to be recirculated through the exhaust gas recirculation passage, based on the load on the engine in a manner such that the time lag coefficient is set to a larger value as the load on the engine is larger.

Also preferably, the exhaust gas recirculation rate-calculating means calculates an amount of the exhaust gases to be recirculated, based on the virtual operation amount calculated by the virtual operation amount-calculating means, and a maximum amount of the exhaust gases to be recirculated, based on operating conditions of the engine detected by the engine operating condition-detecting means, to thereby calculate the exhaust gas recirculation rate, based on the amount of the exhaust gases to be recirculated and the maximum amount of the exhaust gases to be recirculated.

More preferably, the control system includes corrected virtual operation amount-calculating means for calculating a corrected virtual operation amount, based on the rotational speed of the engine detected by the operating condition-detecting means, and wherein the exhaust gas recirculation rate-calculating means calculates the exhaust gas recirculation rate, based on the corrected virtual operation amount and the load on the engine detected by the engine operating condition-detecting means.

Further preferably, if the engine includes valve timing-changing means for controlling valve timing of at least one of intake valves and exhaust valves thereof, the exhaust gas recirculation rate-calculating means calculates the exhaust gas recirculation rate, based on the valve timing controlled by the valve timing-changing means.

Advantageously, the control system includes ignition timing advance value-calculating means for calculating an ignition timing advance value, based on operating conditions of the engine detected by the engine-operating condition-detecting means, advance correction value-calculating means for calculating an ignition timing advance correction value, based on operating conditions of the engine detected by the engine operating condition-detecting means and the inert gas recirculation rate calculated by the inert gas recirculation rate-calculating means, and ignition timing advance value-correcting means for correcting the ignition timing advance value, based on the ignition timing advance correction value calculated by the advance correction value-calculating means.

Also preferably, if the engine includes valve timing-changing means for controlling valve timing of at least one of the intake valves and the exhaust valves, the advance correction value-calculating means calculates the ignition timing advance correction value, based on the valve timing controlled by the valve timing-changing means.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
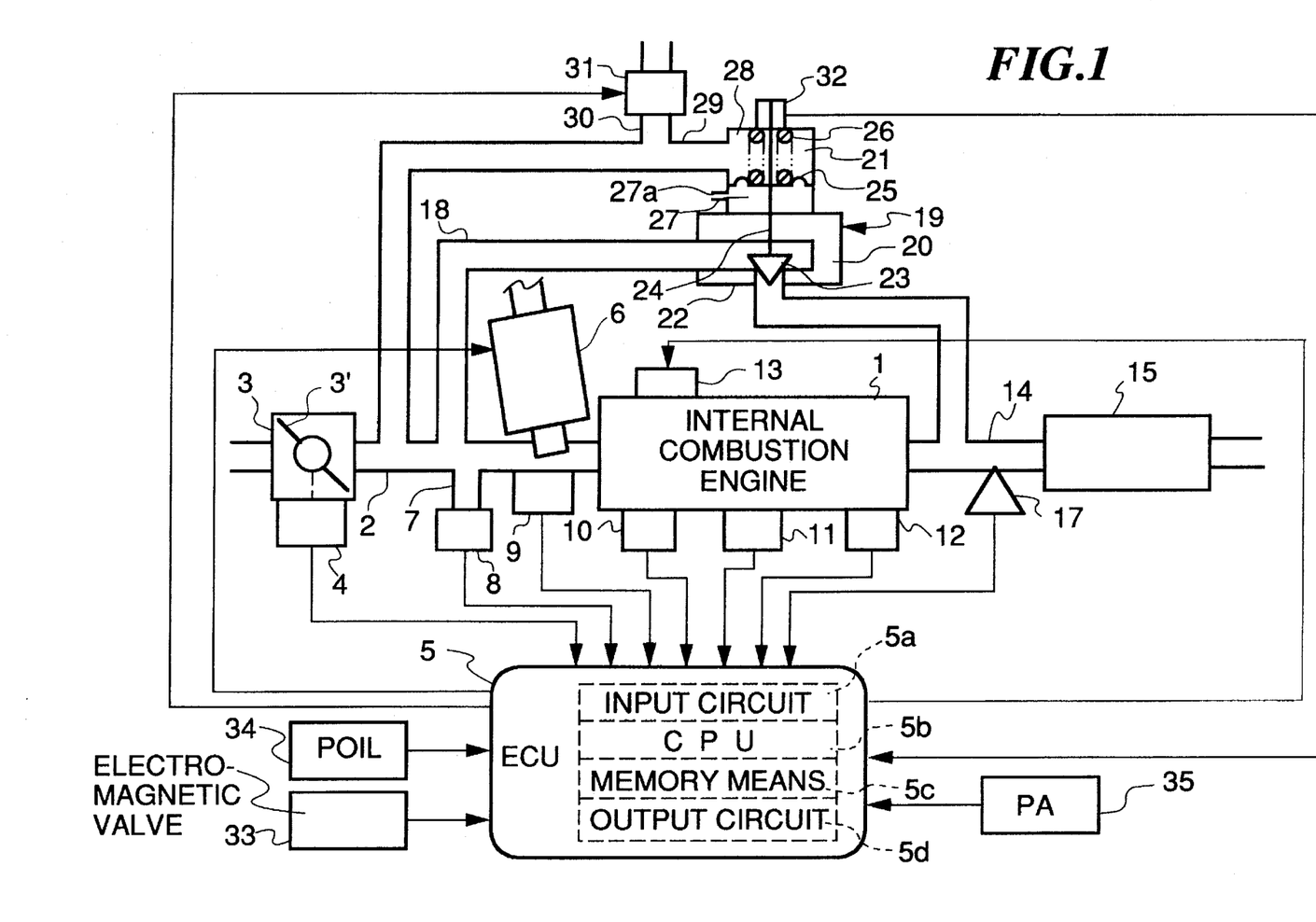
FIG. 1 is a schematic diagram showing the whole arrangement of an internal combustion engine and a control system therefor, according to an embodiment of the invention.

Referring first to FIG. 1, there is illustrated the whole arrangement of an internal combustion engine and a control system therefor, according to an embodiment of the invention.

In the figure, reference numeral 1 designates a DOHC straight type four-cylinder internal combustion engine (hereinafter simply referred to as "the engine"), each cylinder being provided with a pair of intake valves and a pair of exhaust valves, not shown. The engine 1 is so constructed that valve timing (valve opening timing and valve lift) of the intake valves and exhaust valves can be changed over between two stages of high-speed valve timing (high-speed V/T) suitable for operation of the engine in a high rotational speed region and low-speed valve timing (low-speed V/T) suitable for operation of the engine in a low rotational speed region.

In an intake pipe 2, there is arranged a throttle body 3 accommodating a throttle valve 3' therein. A throttle valve opening (θTH) sensor 4 is connected to the throttle valve 3' for generating an electric signal indicative of the sensed throttle valve opening and supplying the same to an electronic control unit (hereinafter referred to as "the ECU") 5.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 opening into the intake pipe 2 at a location downstream of the throttle valve 3', for supplying an electric signal indicative of the sensed absolute pressure PBA within the intake pipe 2 to the ECU 5.

An intake air temperature (TA) sensor 9 is mounted in the wall of the intake pipe 2 at a location downstream of the conduit 7, for supplying an electric signal indicative of the sensed intake air temperature TA to the ECU 5.

An engine coolant temperature (TW) sensor 10 formed of a thermistor or the like is inserted into a coolant passage filled with a coolant and formed in the cylinder block, for supplying an electric signal indicative of the sensed engine coolant temperature TW to the ECU 5.

Further, an engine rotational speed (NE) sensor 11 and a cylinder discriminating (CYL) sensor 12 are arranged in facing relation to a camshaft or a crankshaft of the engine 1, neither of which is shown. The NE sensor 11 generates a pulse as a TDC signal pulse at each of predetermined crank angles whenever the crankshaft rotates through 180 degrees, while the CYL sensor 12 generates a pulse as a CYL signal pulse at a predetermined crank angle of a particular cylinder of the engine, both of the pulses being supplied to the ECU 5.

Each cylinder of the engine has a spark plug 13 electrically connected to the ECU 5 to have its ignition timing controlled by a signal therefrom.

A catalytic converter (three-way catalyst) 15 is arranged in an exhaust pipe 14 extending from the cylinder block of the engine 1, for purifying noxious components present in the exhaust gases, such as HC, CO, and NOx.

Further, a linear output air-fuel ratio sensor (hereinafter referred to as "the LAF sensor") 17 is arranged in the exhaust pipe 14 at a location upstream of the catalytic converter 15, for supplying an electric signal having a voltage level substantially proportional to the sensed concentration of the exhaust gas, to the ECU 5.

An exhaust gas recirculation passage 18 extends between the intake pipe 2 and the exhaust pipe 14 such that it bypasses the cylinder block of the engine 1. The exhaust gas recirculation passage 18 has one end thereof connected to the interior of the exhaust pipe 14 at a location upstream of the LAF sensor 17 (i.e. on the engine side of the same), and the other end thereof connected to the interior of the intake pipe 2 at a location upstream of the PBA sensor 8.

An exhaust gas recirculation control valve (hereinafter referred to as "the EGR valve") 19 is arranged across an intermediate portion of the exhaust gas recirculation passage 18. The EGR valve 19 is comprised of a casing 22 having a valve chamber 20 and a diaphragm chamber 21 defined therein, a wedge-shaped valve element 23 arranged within the valve chamber 20 for vertical movement to open and close the exhaust gas recirculation passage 18, a diaphragm 25 connected to the valve element 23 via a valve stem 24, and a spring 26 urging the diaphragm 25 in the valve-closing direction. Further, the diaphragm chamber 21 has an atmospheric pressure chamber 27 on the lower side thereof and a negative pressure chamber 28 on the upper side thereof defined by the diaphragm 25.

The atmospheric pressure chamber 27 communicates with the atmosphere via a venthole 27a, while the negative pressure chamber 28 is connected to one end of a negative pressure communication passage 29. Specifically, the negative pressure communication passage 29 has the other end thereof connected to the interior of the intake pipe 2 at a location between the throttle valve 3' and the other end of the exhaust gas recirculation passage 18, for guiding the absolute pressure PBA within the intake pipe 2 to the negative pressure chamber 28. An atmosphere communication passage 30 is connected to an intermediate portion of the negative pressure communication passage 29, and a pressure control valve 31 is arranged across the atmosphere communication passage 30. The pressure control valve 31 is formed of a normally-open type electromagnetic valve for selectively causing atmospheric pressure or negative pressure to be supplied into the negative pressure chamber 28 of the diaphragm chamber 21 so as to adjust pressure (control pressure) within the negative pressure chamber 28 in the following manner:

If the pressure control valve 31 is energized to be closed, the negative pressure within the negative pressure chamber 28 increases, i.e. the force acting upon the diaphragm 25 increases, so that the diaphragm 25 moves upward against the urging force of the spring 26 to thereby increase the valve opening (lift) of the EGR valve 19. On the other hand, if the pressure control valve 31 is deenergized to be opened, the negative pressure within the negative pressure chamber 28 decreases, so that the diaphragm 25 moves downward by the urging force of the spring 26 to thereby decrease the valve opening (lift) of the EGR valve 19. In this manner, the valve opening of the EGR valve 19 is controlled by energizing or deenergizing the pressure control valve 31. The pressure control valve 31 is electrically connected to the ECU 5 to be controlled by a command signal therefrom to carry out the above-mentioned lift control operation of the valve element 23 of the EGR valve 19.

Further, the EGR valve 19 is provided with a valve opening (lift) sensor (hereinafter referred to as "the L sensor") 32 for detecting the operating position (lift amount) of the valve element 23, and a signal indicative of the sensed valve lift is supplied from the L sensor 32 to the ECU 5.

Connected to the ECU 5 is an electromagnetic valve 33 for controlling changeover of the valve timing of the intake valves and exhaust valves, valving operation of which is controlled by a signal from the ECU 5. The electromagnetic valve 33 selects either high or low hydraulic pressure applied to a valve timing changeover device, not shown, for actuation thereof. Responsive to this high or low hydraulic pressure, the valve timing changeover device operates to change the valve timing to either the high-speed V/T or the low-speed V/T. The hydraulic pressure applied to the valve timing changeover device is detected by a hydraulic pressure (POIL) sensor 34 which supplies a signal indicative of the sensed hydraulic pressure to the ECU 5.

Further, an atmospheric pressure (PA) sensor 35 is mounted in the engine at a suitable location thereof, and supplies a signal indicative of the sensed atmospheric pressure to the ECU 5.

The ECU 5 is comprised of an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM storing various operational programs which are executed by the CPU 5b, and various maps and tables, referred to hereinafter, and a RAM for storing results of calculations therefrom, etc., and an output circuit 5d which outputs driving signals to the fuel injection valves 6, spark plugs 13, pressure control valve 31, etc.

The CPU 5b operates in response to the above-mentioned signals from the sensors to determine operating conditions in which the engine 1 is operating, such as an air-fuel ratio feedback control region in which air-fuel ratio control is carried out in response to oxygen concentration in exhaust gases, and open-loop control regions, and calculates, based upon the determined engine operating conditions, a valve opening period or fuel injection period TOUT over which the fuel injection valves 6 are to be opened in synchronism with generation of TDC signal pulses, by the use of the following equation (1). Results of the calculations are stored into the RAM of the memory means 5c:

$$TOUT = TiM \times KCMDM \times KLAF \times KEGRT \times K1 + K2 \qquad (1)$$

where TiM represents a basic value of the fuel injection period TOUT, which is determined according to engine operating parameters, such as the engine rotational speed NE and the intake pipe absolute pressure PBA, by the use of a TiM map, not shown. The TiM map is comprised of two kinds of maps, one for the low-speed V/T, and the other for the high-speed V/T, which are stored in the ROM of the memory means 5c.

KCMDM represents a modified desired air-fuel ratio coefficient, which is obtained by multiplying a desired air-fuel ratio coefficient KCMD by a fuel cooling-dependent correction coefficient KETV. The fuel cooling-dependent correction coefficient KETV is for correcting the fuel injection amount to compensate for a change in the intake air amount, which is caused by a cooling effect due to actual fuel injection. The KETV value is determined in response to the desired air-fuel ratio coefficient KCMD.

KLAF represents an air-fuel ratio correction coefficient which is set to a value such that the air-fuel ratio detected by the LAF sensor 17 becomes equal to a desired value when the engine 1 is operating in the air-fuel ratio feedback control region, while it is set to predetermined values corresponding to the respective open-loop control regions of the engine when the engine 1 is in the open-loop control regions.

KEGRT represents a recirculation rate of inert gases which do not contribute to combustion (hereinafter referred to as "the inert gas recirculation rate") out of a recirculation rate of the whole exhaust gases (hereinafter referred to as "the exhaust gas recirculation rate"). The inert gas recirculation rate KEGRT is calculated, based on the exhaust gas recirculation rate KEGR and the output value from the LAF sensor 17.

K1 and K2 represent other correction coefficients and correction variables, respectively, which are set according to engine operating parameters to such values as optimize engine operating characteristics, such as fuel consumption and engine accelerability.

Further, the CPU 5b calculates an ignition timing advance value θIG to determine the ignition timing of the engine in response to engine parameter signals from various sensors, by the use of the following equation (2):

$$\theta IG = \theta IGMAP + \theta IGEGR \quad (2)$$

where θIGMAP represents a basic ignition timing advance value, which is determined according to operating parameters of the engine, such as the engine rotational speed NE and the intake pipe absolute pressure PBA, by the use of a θIGMAP map. The θIGMAP map is comprised of two kinds of maps, one for the low-speed V/T, and the other for the high-speed V/T, which are stored in the ROM of the memory means 5c.

θIGERG represents an ignition timing advance correction value which is set to predetermined values corresponding to operating conditions of the engine and the inert gas recirculation rate.

Further, the ECU 5 includes first-order time lag coefficient-determining means (dynamic characteristic-calculating means) for determining a first-order time lag coefficient KLIFT (dynamic characteristics) of a first-order time lag of exhaust gases to be recirculated, based on operating conditions of the engine, virtual lift value-determining means (virtual operation amount-calculating means) for determining a virtual lift value LCAL (virtual operation amount), based on the first-order time lag coefficient KLIFT, exhaust gas recirculation rate-determining means for determining an exhaust gas recirculation rate KEGR in response to the virtual lift value LCAL and engine operating conditions, and inert gas recirculation rate-calculating means for calculating an inert gas recirculation rate KEGRT in response to the exhaust gas recirculation rate KEGR and an output value of the LAF sensor 17.

Figure 2:
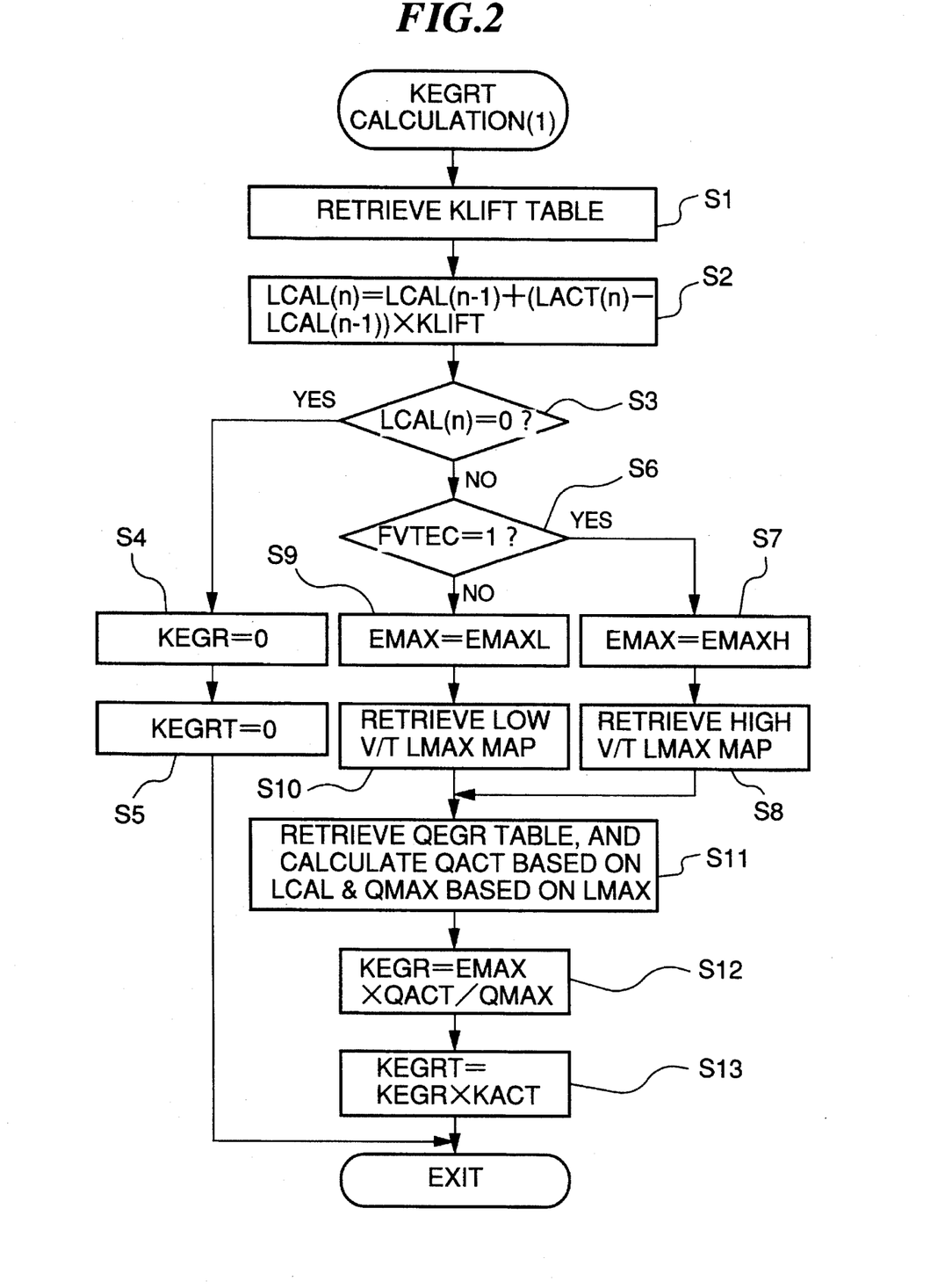
FIG. 2 is a flowchart showing a program for calculating an inert gas recirculation rate KEGRT.

FIG. 2 shows a program for calculating the inert gas recirculation rate KEGRT. This program is executed in synchronism with generation of TDC signal pulses.

First, at a step S1, a KLIFT table is retrieved to determine a first-order time lag coefficient KLIFT which indicates dynamic characteristics of exhaust gases to be recirculated.

Figure 3A:
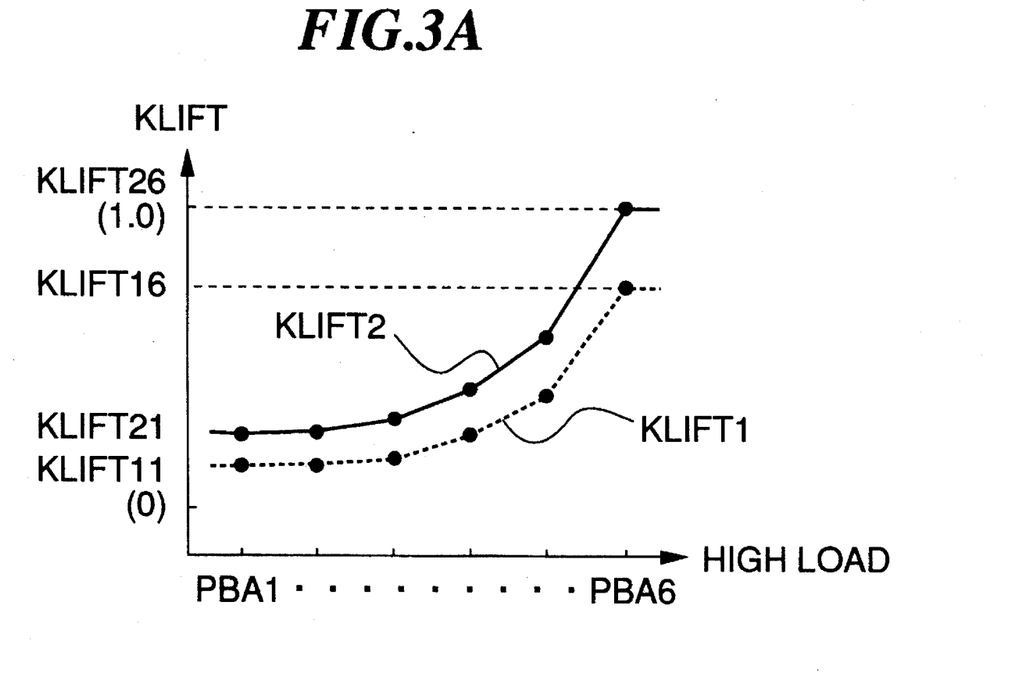
FIG. 3A shows a KLIFT/PBA table for determining a first-order time lag correction coefficient KLIFT.
Figure 3B:
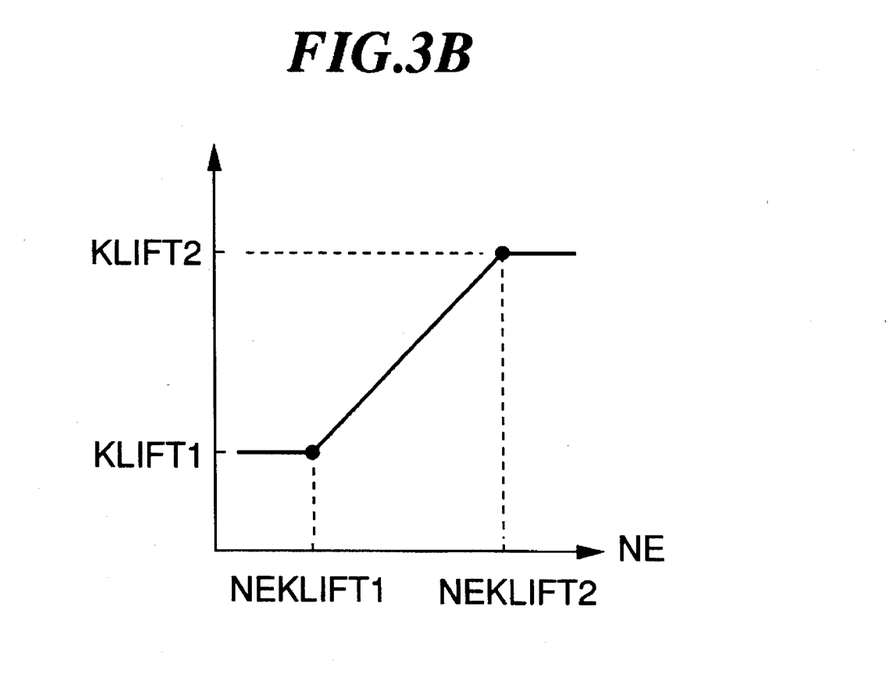
FIG. 3B shows a KLIFT/NE table which is used together with the KLIFT/PBA table of FIG. 3A for determining the first-order time lag correction coefficient KLIFT.

As shown in FIG. 3A, the KLIFT/PBA table sets a first-order time lag coefficient value KLIFT1 (indicated by the broken line in FIG. 3A) employed when the engine rotational speed NE is lower than a predetermined value NEKLIFT1 (see FIG. 3B) and a first-order time lag coefficient value KLIFT2 (indicated by the broken line in FIG. 3A) employed when the engine rotational speed NE is higher than a predetermined value NEKLIFT2 (see FIG. 3B), where predetermined values KLIFT11 and KLIFT21 to KLIFT16 and KLIFT26 are allotted to intake pipe absolute pressure values PBA1 to PBA6, respectively. First, by using the KLIFT/PBA table of FIG. 3A, the KLIFT1 and KLIFT2 values are determined or read out in accordance with the PBA value, and by interpolation if the PBA value falls between adjacent ones of the predetermined values PBA1 to PBA6. Then, by using a KLIFT/NE table in FIG. 3B, when NE≧NEKLIFT2 or NE≧NEKLIFT1 holds, the KLIFT value is directly set to the KLIFT1 value or the KLIFT2 value determined as above, whereas when NEKLIFT1<NE<NEKLIFT2 holds, the KLIFT value is determined in accordance with the NE value by interpolation. According to the tables of FIGS. 3A and 3B, the first-order time lag coefficient value KLIFT is set to a value within a range of 0 to 1.0, such that it is set to a larger value as the intake pipe absolute pressure PBA is larger. This setting reflects the fact that the larger the load on the engine, the larger the dynamic delay of exhaust gases to be recirculated.

Next, at a step S2, a virtual lift value LCAL(n) of the EGR valve 19 is calculated with the dynamic characteristics of exhaust gases to be recirculated, taken into account, by the use of the following equation (3):

$$LCAL(n) = LCAL(n-1) + (LACL(n) - LCAL(n-1)) \times KLIFT \quad (3)$$

where LCAL(n−1) represents a value of the virtual lift value LCAL obtained in the last loop of execution of the program, and LACT(n) an actual lift value detected by the L sensor 32 in the present loop. Thus, a difference between the present actual lift value LACT(n) and the last virtual lift value LCAL(n−1) is multiplied by the first-order time lag coefficient KLIFT, and then the last virtual lift value LCAL(n−1) is added to the resulting product, to thereby obtain the present virtual lift value LCAL(n), which reflects the dynamic characteristics of exhaust gases to be recirculated.

Figure 4:
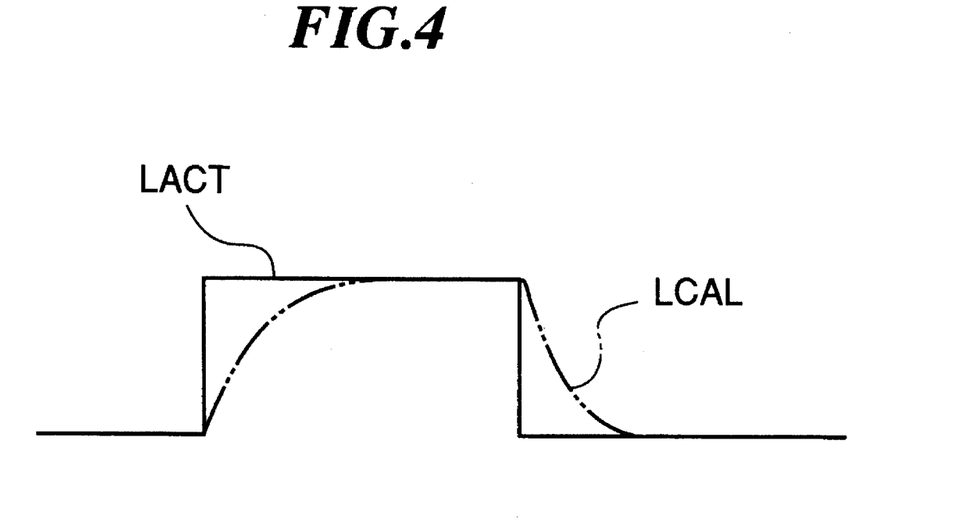
FIG. 4 is a schematic view showing, for the sake of comparison, an actual lift of an exhaust gas recirculation control (EGR) valve 19 appearing in FIG. 1, which is detected by a lift sensor, and a virtual lift of the EGR valve.

FIG. 4 shows, for the sake of comparison, a sample of the actual lift value LACT of the EGR valve 19 detected by the L sensor 32 and a sample of the virtual lift value LCAL calculated as above, provided that the engine rotational speed NE and the valve opening θTH of the throttle valve 3' are constant. In the figure, the solid line indicates the detected actual lift value LACT of the EGR valve 19, and the two-dot chain line indicates the virtual lift value LCAL of the same.

As will be learned from FIG. 4, actually the EGR valve 19 carries out a lifting operation as shown by the detected actual lift value LACT in response to a valve lift command from the ECU 5 during exhaust gas recirculation, irrespective of the dynamic delay of exhaust gases to be recirculated. In the present embodiment, this dynamic delay is taken into account such that the fuel injection control is carried out on the assumption that the EGR valve 19 carried out a lifting operation with a delay corresponding to the dynamic delay, as shown by the virtual lift value LCAL indicated by the two-dot chain line.

Referring again to FIG. 2, then, at a step S3 it is determined whether or not the virtual lift value LCAL is equal to "0". In the first loop of execution of the program, the virtual lift value LCAL is equal to "0", and therefore the program proceeds to a step S4, wherein the exhaust gas recirculation rate KEGR is set to "0". Then, at a step S5 the inert gas recirculation rate KEGRT is set to "0", followed by terminating the program.

Figure 5:
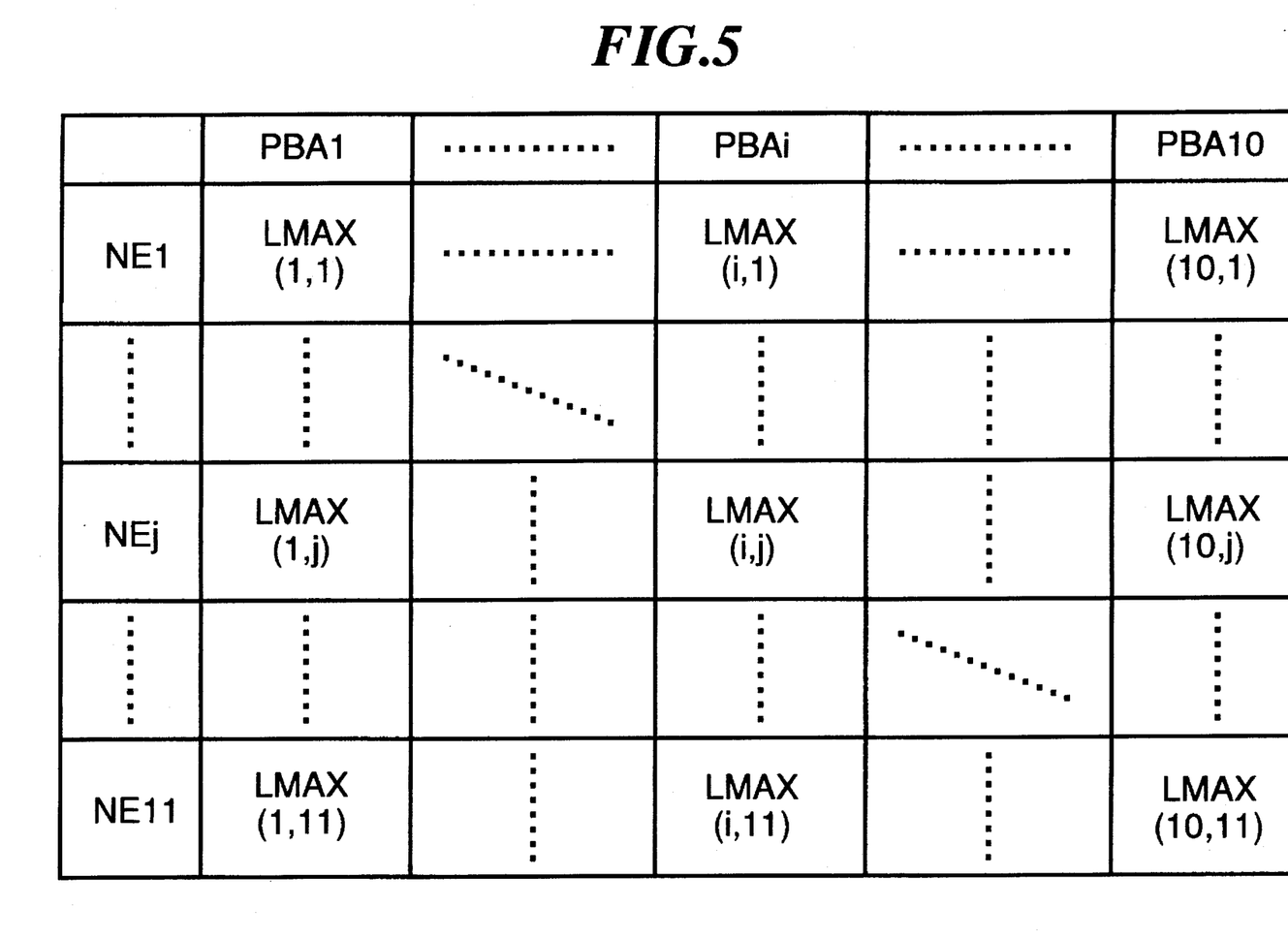
FIG. 5 shows an LMAX map for high-speed valve timing V/T, for determining a maximum lift value LMAX when the valve timing is set to the high-speed V/T.

On the other hand, if in the second loop of this program or a subsequent loop, the answer to the question at the step S3 is negative (NO), the program proceeds to a step S6, wherein it is determined whether or not a flag FVTEC is set to "1" that is, whether or not the valve timing is set to the high-speed V/T. If the answer to the question is affirmative (YES), i.e. if the valve timing is set to the high-speed V/T, the program proceeds to a step S7, wherein a maximum desired exhaust gas recirculation rate EMAX is set to a predetermined value EMAXH suitable for the high-speed V/T. Then, at a step S8 an LMAX map for the high-speed V/T is retrieved to determine a maximum lift value LMAX for the high-speed V/T, followed by the program proceeding to a step S11.

The high-speed V/T LMAX map is set, as shown in FIG. 5, such that map values LMAX (1,1) to LMAX (10, 11) are provided, which correspond, respectively, to predetermined intake pipe absolute pressure values PBA1 to PBA10 and predetermined engine rotational speeds NE1 to NE11. Thus, the maximum lift value LMAX is read by retrieving the high-speed V/T LMAX map in response to engine operating conditions, or additionally calculated by interpolation, if required.

On the other hand, if the answer to the question at the step S6 is negative (NO), i.e. if the valve timing is set to the low-speed V/T, the program proceeds to a step S9, wherein the maximum desired exhaust gas recirculation rate EMAX is set to a predetermined value EMAXL suitable for the low-speed V/T. Then, at a step S10 an LMAX map for the low-speed V/T is retrieved to determine the maximum lift value LMAX, followed by the program proceeding to the step S11.

The low-speed V/T LMAX map, not shown, is set, similarly to the high-speed V/T LMAX map, such that map values are provided, which correspond, respectively, to predetermined engine rotational speeds NE and predetermined intake pipe absolute pressure values PBA. Thus, the maximum lift value LMAX is read by retrieving the low-speed V/T LMAX map in response to engine operating conditions, or additionally calculated by interpolation, if required.

At a step S11, a QEGR table is retrieved to determine an actual exhaust gas flow rate QACT based on the virtual lift value LCAL and a maximum flow rate QMAX based on the maximum lift value LMAX.

Figure 6:
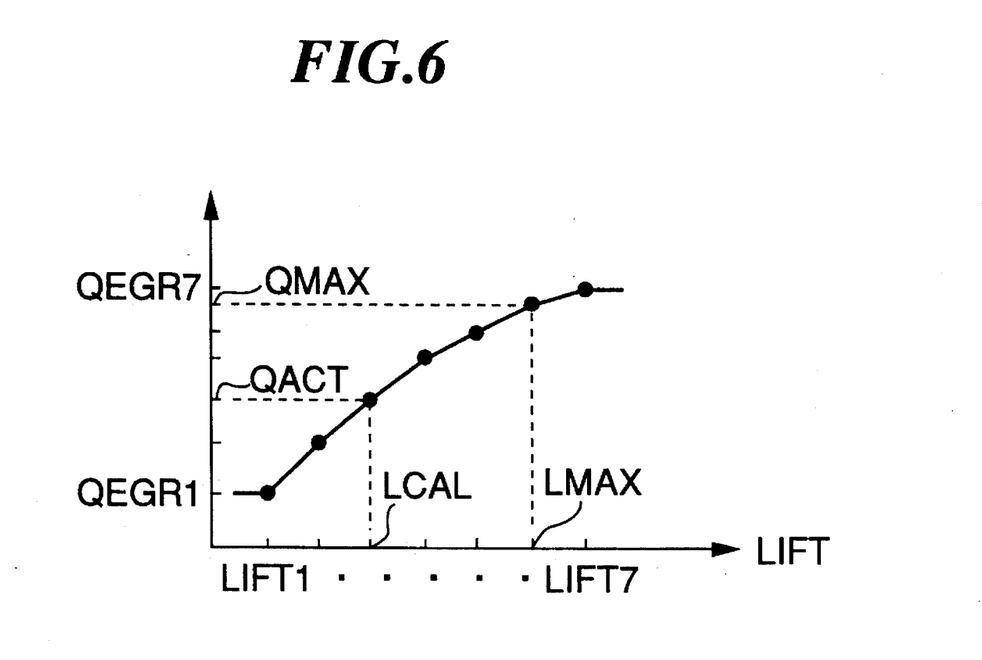
FIG. 6 shows a QEGR table showing the relationship between a lift value LIFT of the EGR valve and a flow rate QEGR of exhaust gases to be recirculated.

Specifically, the QEGR table is set, as shown in FIG. 6, such that amount values of exhaust gases to be recirculated QEGR1 to QEGR7 are provided, which correspond, respectively, to predetermined lift values LIFT1 to LIFT7 of the EGR valve 19. Thus, the actual flow rate QACT and the maximum flow rate QMAX are determined based on the virtual lift value LCAL and the maximum lift value LMAX, respectively, by retrieving the QEGR table.

Then, the program proceeds to a step S12, wherein the exhaust gas recirculation rate KEGR is calculated by the use of the following equation (4):

$$KEGR = EMAX \times (QACT/QMAX) \quad (4)$$

Then, at a step S13 the inert gas recirculation rate KEGRT is calculated by multiplying the exhaust gas recirculation rate KEGR by a detected air-fuel ratio-dependent coefficient KACT which has been calculated by a KACT calculating routine, not shown, followed by terminating the program. The detected air-fuel ratio-dependent coefficient KACT is an equivalent ratio of the air-fuel ratio (14.7/(A/F)) detected in response to output voltage from the LAF sensor 17. The exhaust gas pressure varies in response to variations in the intake pipe absolute pressure PBA, engine rotational speed NE, and atmospheric pressure PA, and therefore the detected air-fuel ratio-dependent coefficient KACT is corrected by the above operating parameters.

Thus, the fuel injection amount is calculated based on the above calculated inert gas recirculation rate KEGRT, by the use of the aforesaid equation (1), whereby engine control can be carried out with high accuracy, based on the fuel injection amount which takes into account the dynamic delay of exhaust gases to be recirculated.

Further, the ECU 5 further includes ignition timing advance correction value-calculating means for calculating the ignition timing advance correction value θIGEGR, based on engine operating conditions and the inert gas recirculation rate KEGRT.

Figure 7:
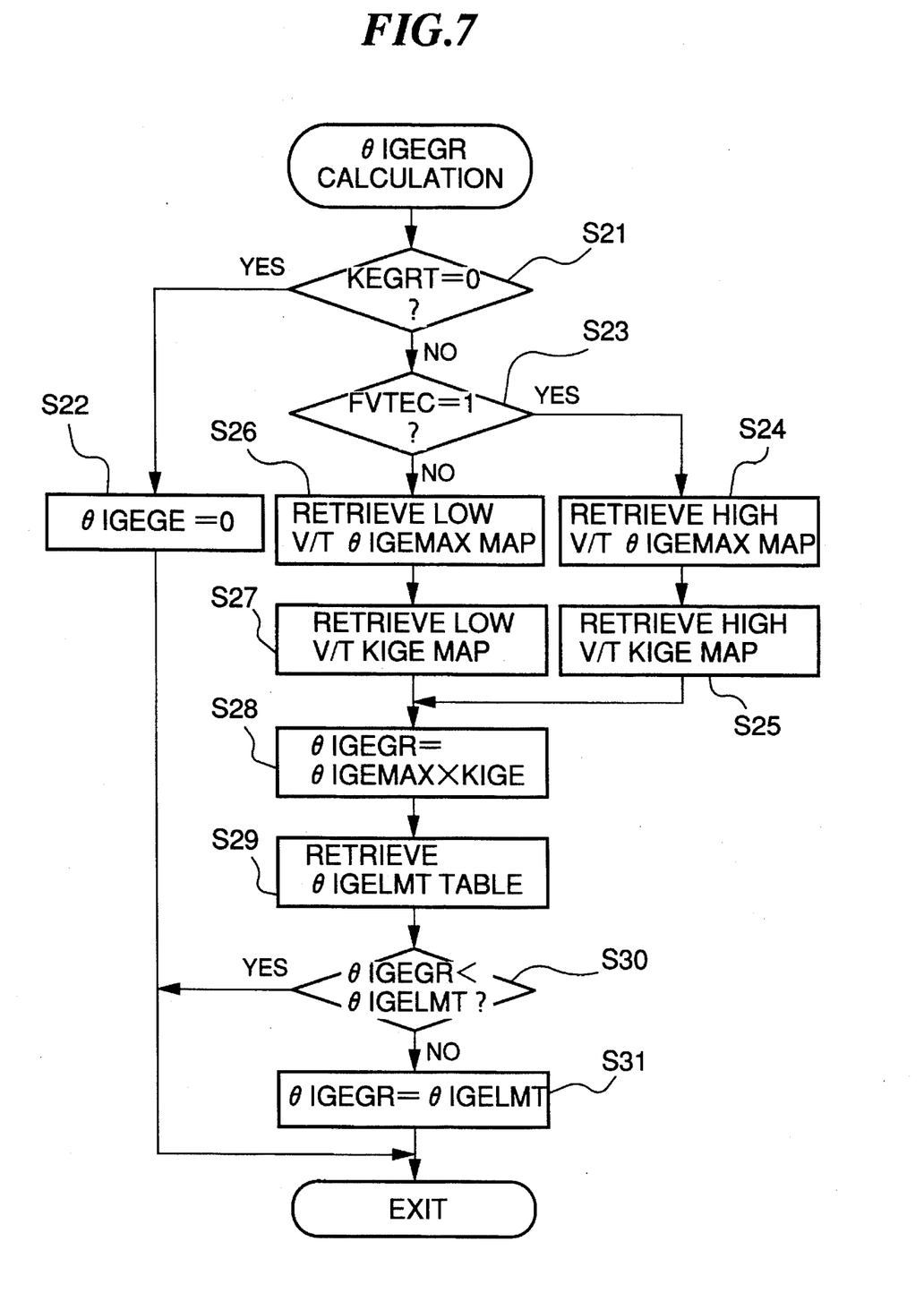
FIG. 7 is a flowchart showing a program for calculating an ignition timing advance correction value θIGEGR.

FIG. 7 shows a program for calculating the ignition timing advance correction value θIGEGR. This program is executed in synchronism with generation of TDC signal pulses.

At a step S21, it is determined whether or not the inert gas recirculation rate KEGRT is equal to "0". If the answer to the question is affirmative (YES), i.e. if the inert gas recirculation rate KEGRT is equal to "0", the first-order time lag correction of exhaust gases to be recirculated is not carried out (i.e. the case where the program proceeds through the steps S3, S4 and S5 in FIG. 2), and therefore the program proceeds to a step S22, wherein the ignition timing advance correction value θIGEGR is set to "0", followed by terminating the program.

On the other hand, if the answer to the question at the step S21 is negative (NO), the program proceeds to a step S23, wherein it is determined whether or not the flag FVTEC is set to "1", that is, whether or not the valve timing is set to the high-speed V/T. If the answer to the question is affirmative (YES), i.e. if the valve timing is set to the high-speed V/T, the program proceeds to a step S24, wherein a θIGEMAX map for the high-speed V/T is retrieved to determine a maximum advance value θIGEMAX to be assumed when the amount of exhaust gases to be recirculated is the maximum and at the same time the valve timing is set to the high-speed V/T.

Figure 8:
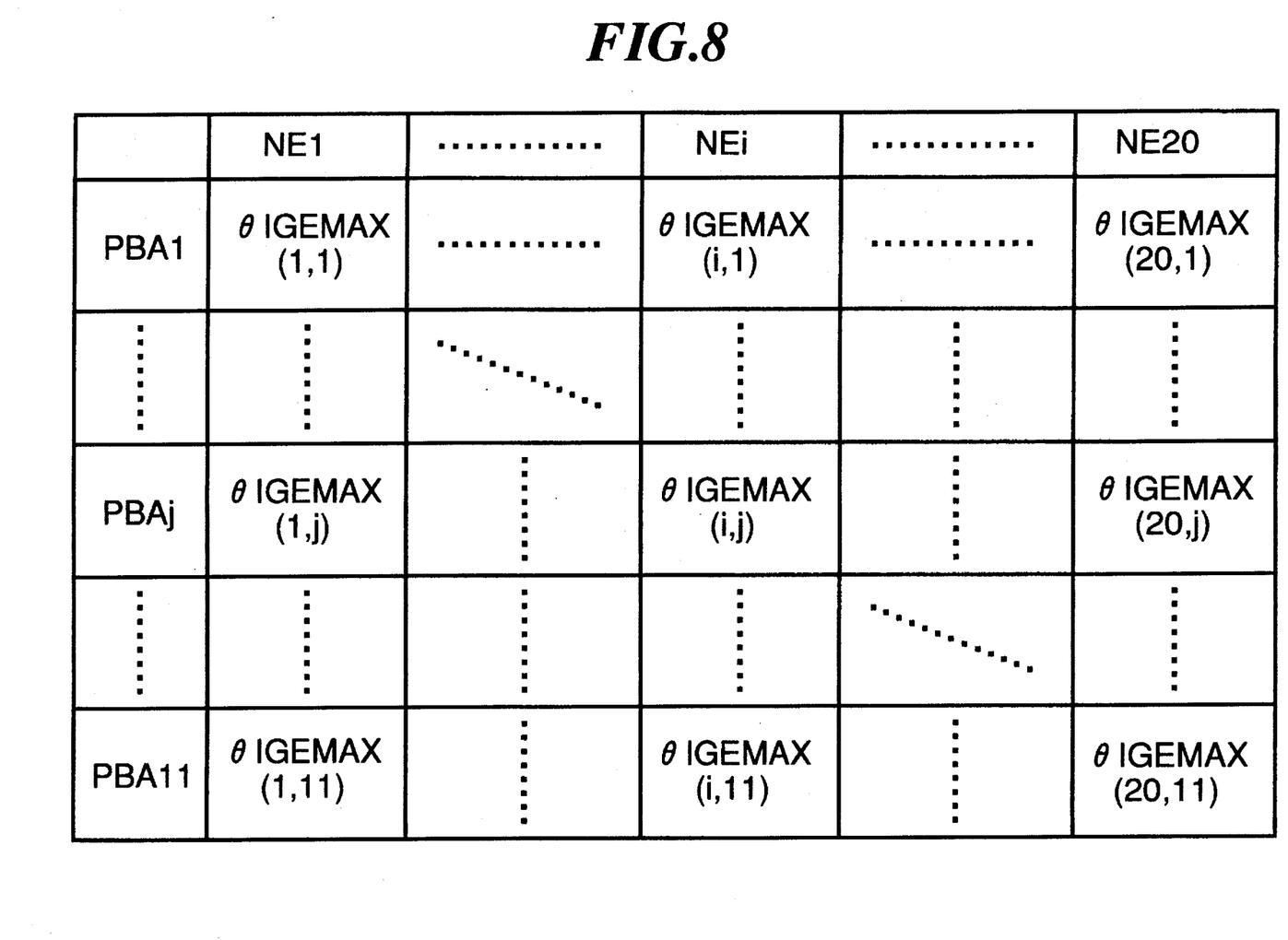
FIG. 8 shows a θIGEMAX map for the high-speed V/T, for determining a maximum advance value θIGEMAX when the flow rate of exhaust gases to be recirculated is the maximum and at the same time the valve timing is set to the high-speed V/T.

The high-speed V/T θIGEMAX map is set, as shown in FIG. 8, such that map values θIGEMAX (1,1) to θIGEMAX (20,11) are provided, which correspond, respectively, to predetermined engine rotational speed values NE1 to NE20 and predetermined intake pipe absolute pressure values PBA1 to PBA11. Thus, the maximum advance value θIGEMAX is read by retrieving the high-speed V/T θIGEMAX map in response to engine operating conditions, or additionally calculated by interpolation, if required.

Then, at a step S25 a KIGE table for the high-speed V/T is retrieved to determine an ignition timing advance correction value KIGE based on the inert gas recirculation rate KEGRT, followed by the program proceeding to a step S28.

Figure 9:
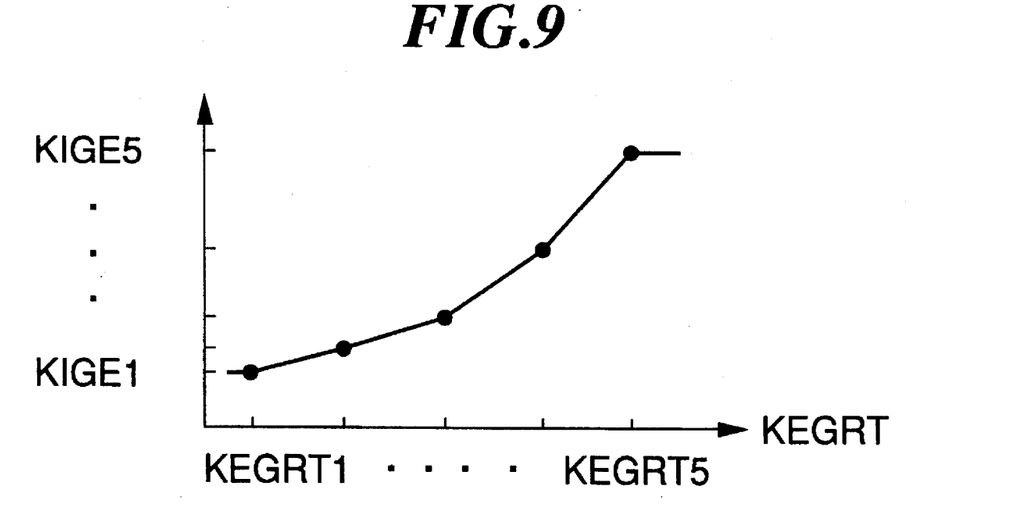
FIG. 9 shows a KIGE table for the high-speed V/T, for determining an ignition timing correction coefficient KIGE for the high-speed V/T.

The high-speed V/T KIGE table is set, as shown in FIG. 9, such that table values KIGE1 to KIGE5 are provided, which correspond, respectively, to predetermined inert gas recirculation rate values KEGRT1 to KEGRT5. Thus, the ignition timing advance correction coefficient value KIGE is read by retrieving the high-speed V/T KIGE table, or additionally calculated by interpolation, if required.

As is apparent from FIG. 9, it is required that the ignition timing be advanced by a larger amount as the inert gas recirculation rate KEGRT increases, and therefore the ignition timing advance correction coefficient KIGE is set to a larger value as the inert gas recirculation rate KEGRT increases.

On the other hand, if the answer to the question at the step S23 is negative (NO), i.e. if the valve timing is set to the low-speed V/T, a θIGEMAX map for the low-speed V/T is retrieved to determine a maximum advance value θIGEMAX to be assumed when the flow rate of exhaust gases to be recirculated is maximum and at the same time the valve timing is set to the low-speed V/T.

The low-speed V/T θIGEMAX map, not shown, is set, similarly to the high-speed V/T θIGEMAX map, such that map values are provided, which correspond, respectively, to predetermined engine rotational speed values NE and predetermined intake pipe absolute pressure values PBA. Thus, the maximum advance value θIGEMAX is read by retrieving the low-speed V/T θIGEMAX map in response to engine operating conditions, or additionally calculated by interpolation, if required.

At a step S27, a KIGE table for the low-speed V/T is retrieved to determine the ignition timing advance correction coefficient KIGE based on the inert gas recirculation rate KEGRT for the low-speed V/T, and then the program proceeds to a step S28.

The low-speed V/T KIGE table, not shown, is set, similarly to the high-speed V/T KIGE table, such that table values KIGE are provided, which correspond, respectively, to predetermined values of the inert gas recirculation rate KEGRT. Thus, the ignition timing advance correction coefficient value KIGE is read by retrieving the low-speed V/T KIGE table, or additionally calculated by interpolation, if required.

At a step S28, the ignition timing advance correction value θIGEGR is calculated by multiplying the maximum advance value θIGEMAX by the ignition timing advance correction coefficient value KIGE, and then at a step S29, a θIGELMT table is retrieved to determine a limit ignition timing advance correction value θIGELMT.

Figure 10:
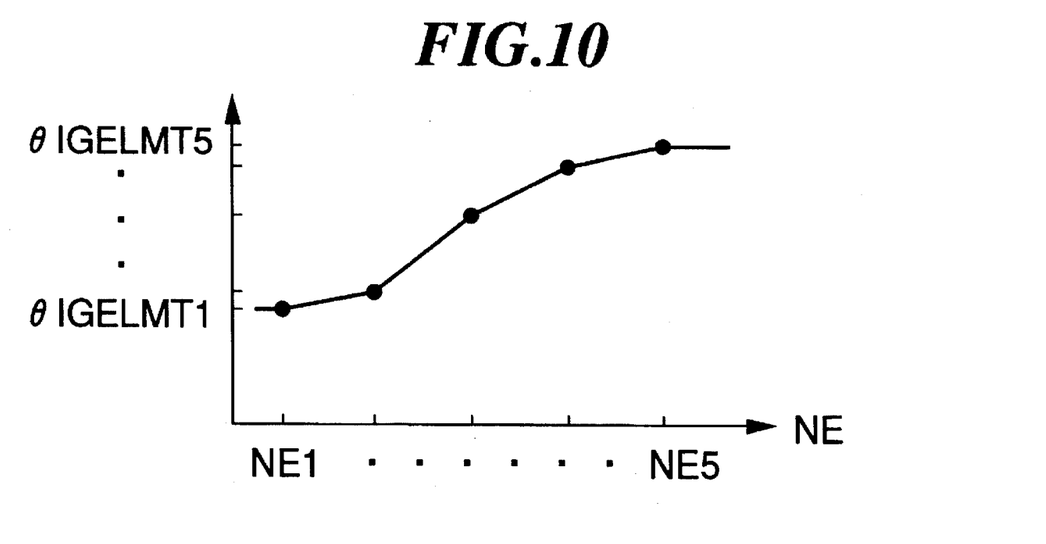
FIG. 10 shows a θIGELMT table for determining a limit ignition timing advance correction value θIGELMT.

The θIGELMT table is set, as shown in FIG. 10, such that table values θIGELMT1 to θIGELMT5 are provided, which correspond, respectively, to predetermined engine rotational speed values NE1 to NE5. Thus, the limit ignition timing advance correction value θIGELMT is read by retrieving the θIGELMT table, or additionally calculated by interpolation, if required.

Next, at a step S30, it is determined whether or not the ignition timing advance correction value θIGEGR calculated at the step S28 is smaller than the limit ignition timing advance correction value θIGELMT calculated at the step S29. If the answer to the question is affirmative (YES), the program is immediately terminated, whereas if the answer is negative (NO), the ignition timing advance correction value θIGELM is set to the limit ignition timing advance correction value θIGELMT at a step S31, followed by terminating the program.

The thus calculated ignition timing advance correction value θIGEGR is substituted into the aforesaid equation (2) to calculate the ignition timing advance value θIG, whereby ignition timing control is carried out based on the thus calculated ignition timing advance value θIG.

Figure 11:
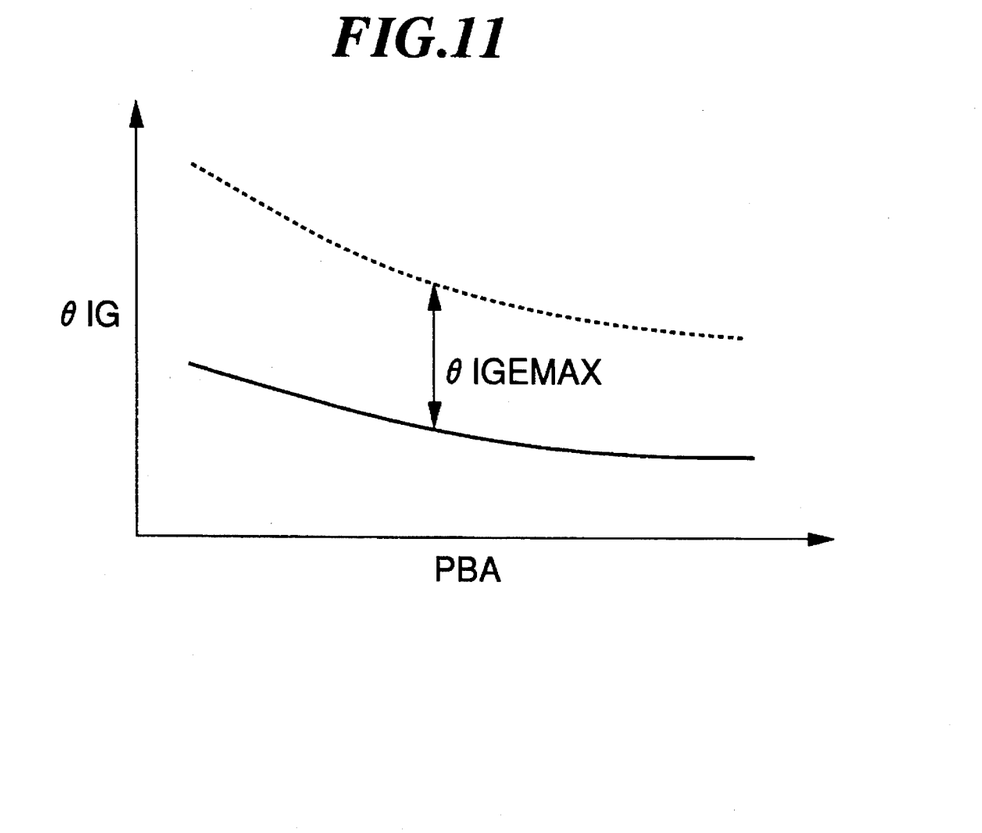
FIG. 11 is a graph showing a curve of optimum ignition timing (indicated by the broken line) to be assumed when the exhaust gas recirculation is carried out and a curve of optimum ignition timing (indicated by the solid line) to be assumed when the exhaust gas recirculation is in stoppage.

FIG. 11 shows the relationship between the ignition timing advance value θIG and the intake pipe absolute pressure PBA, wherein the solid line indicates a curve of optimum ignition timing to be assumed when exhaust gas recirculation is in stoppage, while the broken line indicates a curve of optimum ignition timing to be assumed when the amount of exhaust gases to be recirculated is the maximum. The difference between the two curves corresponds to the magnitude of the maximum advance value θIGEMAX, and the ignition timing advance correction value θIGEGR is set to a value within the range between the two curves. Thus, the ignition timing can be corrected in dependence on the dynamic delay of exhaust gases to be recirculated, thereby enabling to achieve engine control based on optimum ignition timing.

The present embodiment should not be construed to be limitative, but any variation thereto is possible within the scope of the present invention.

Figure 12:
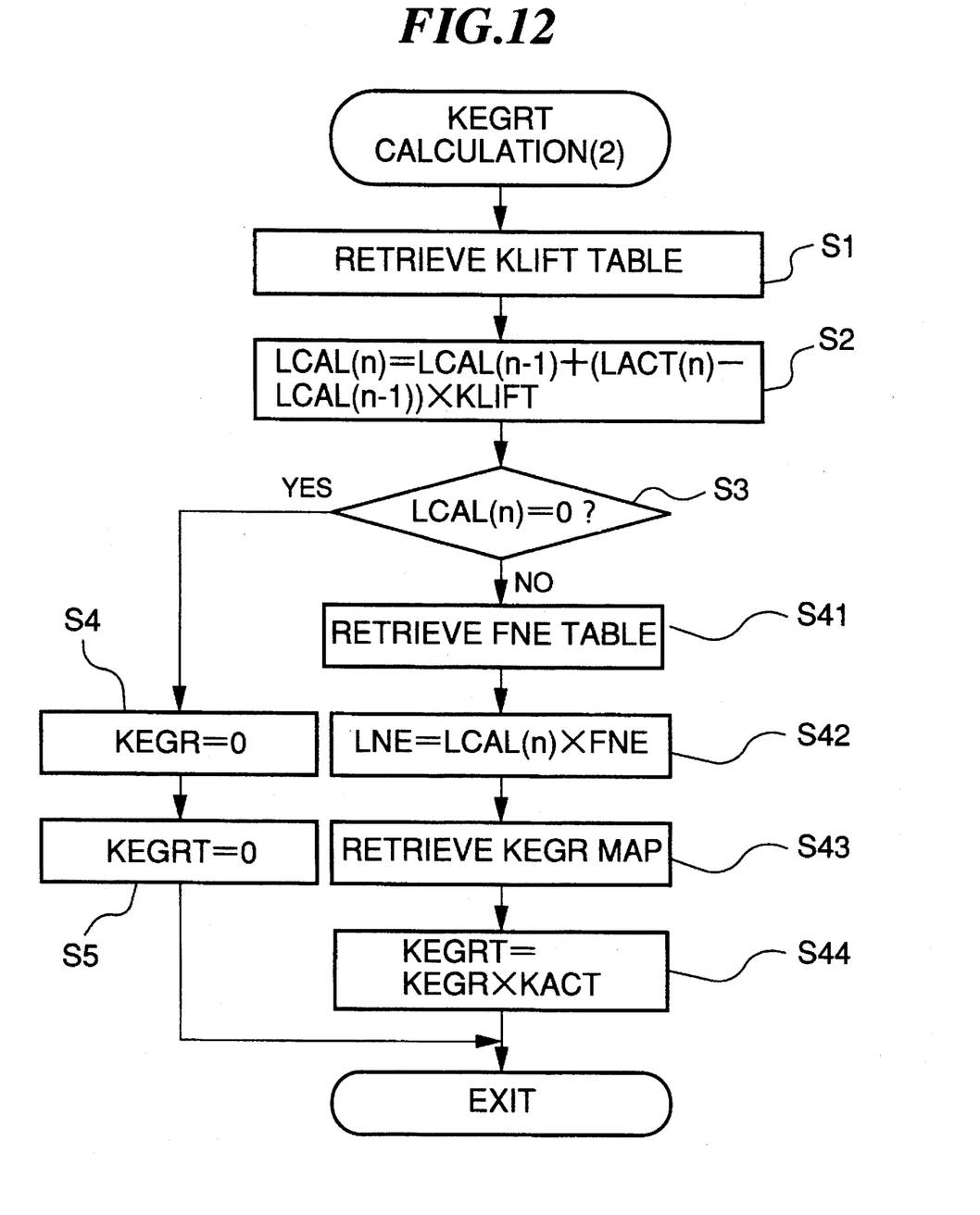
FIG. 12 is a flowchart showing a program for calculating the inert gas recirculation rate KEGRT, according to a second embodiment of the invention.

FIG. 12 shows a program for calculating the inert gas recirculation rate KEGRT, according to a second embodiment of the invention. This program is executed in synchronism with generation of TDC signal pulses.

According to the second embodiment, the inert gas recirculation rate KEGRT is calculated at steps S41 to S43 in a different manner from the calculations of the actual flow rate QACT based on the virtual lift value LCAL and the maximum flow rate QMAX based on the maximum lift value LMAX, which are executed at the step S11 in FIG. 2. In the present embodiment, it is assumed that the valve timing is fixed for the simplification of explanation. However, the valve timing may be variable as in the first embodiment.

The steps S1 to S3 are carried out in the same manner as in the first embodiment, and if the answer to the question at the step S3 becomes negative (NO), the program proceeds to a step S41, wherein an FNE table is retrieved to determine a rotational speed correction coefficient FNE.

Figure 13:
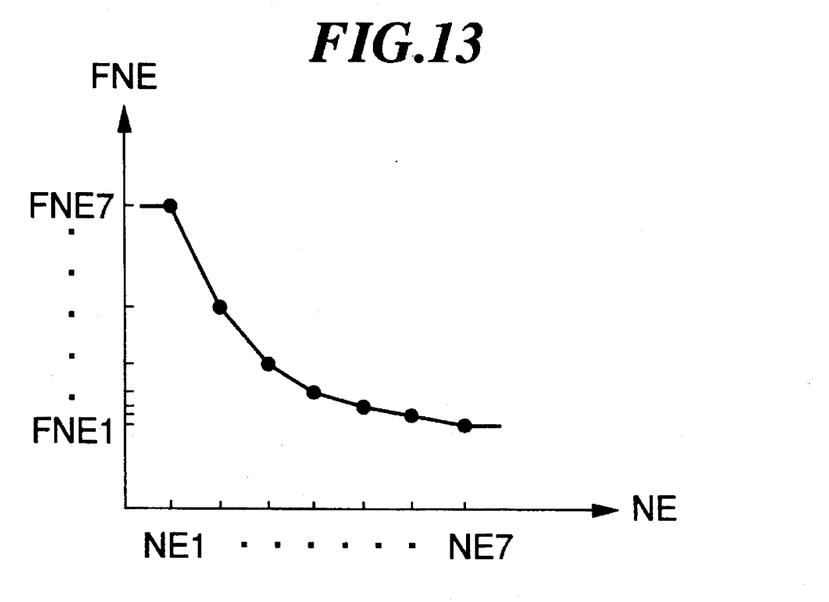
FIG. 13 shows an FNE table for determining a rotational speed-dependent correction coefficient FNE.

The FNE table is set, as shown in FIG. 13, such that rotational speed correction coefficient values FNE1 to FNE7 are provided, which correspond, respectively, to predetermined engine rotational speed values NE1 to NE7, and the rotational speed correction coefficient value FNE is thus read by retrieving the FNE table, or additionally calculated by interpolation, if required. As is apparent from the table, the rotational speed correction coefficient FNE is set to a larger value as the engine rotational speed NE is smaller.

Then, at a step S42 a corrected virtual operation amount LNE is calculated by multiplying the virtual lift value LCAL calculated at the step S2 by the above obtained rotational speed correction coefficient FNE. Further, at a step S43 a KEGR map is retrieved to determine the exhaust gas recirculation rate KEGR.

Figure 14:
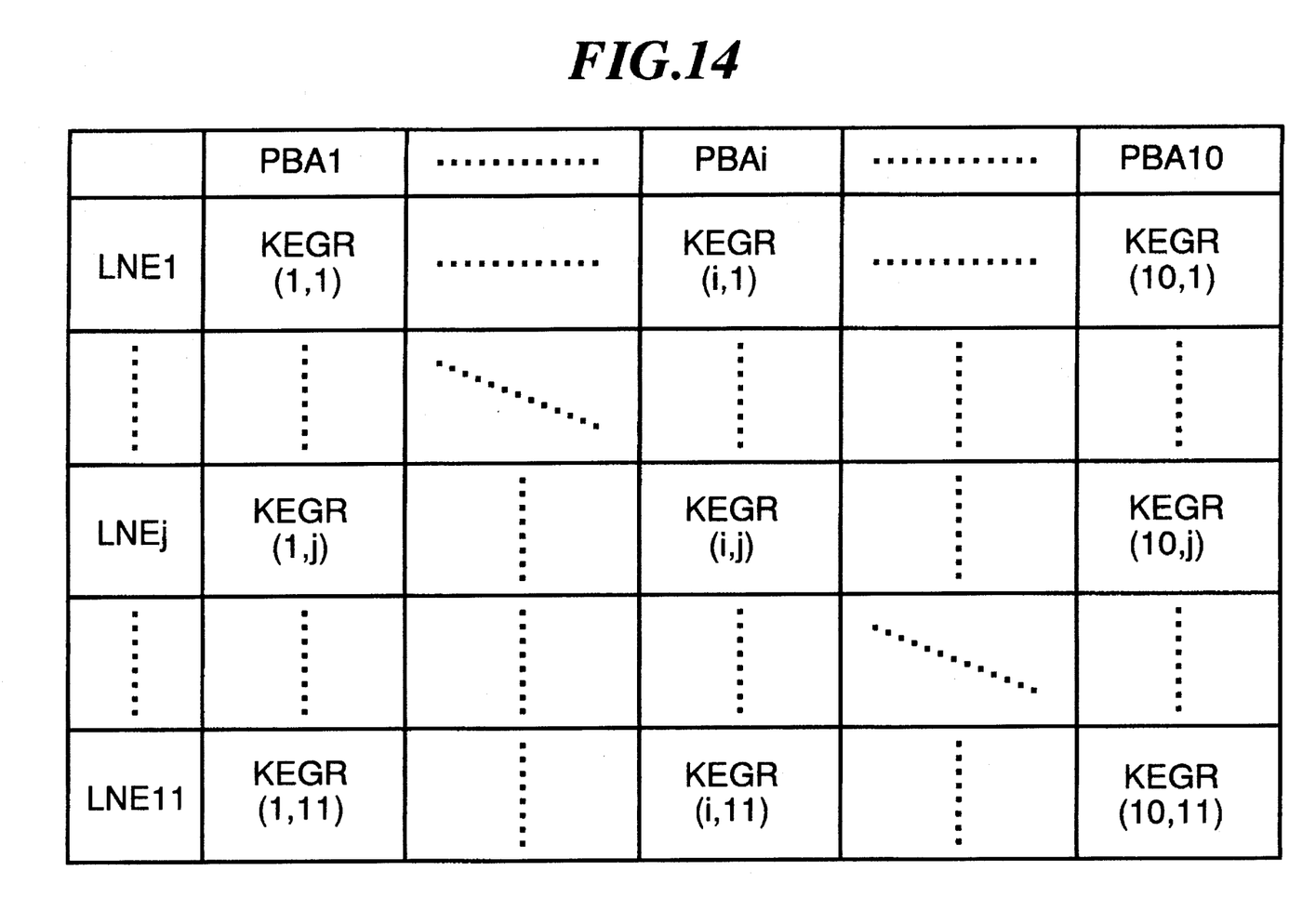
FIG. 14 is a KEGR map for determining an exhaust gas recirculation rate KEGR.

The KEGR map is set, as shown in FIG. 14, such that map values KEGR (1,1) to KEGR (10,11) are provided, which correspond, respectively, to predetermined intake pipe absolute pressure values PBA01 to PBA10 and corrected virtual operation amounts LNE01 to LNE10. Thus, the exhaust gas recirculation rate KEGR is read by retrieving the KEGR map, or additionally calculated by interpolation, if required.

Then, at a step S44, the inert gas recirculation rate KEGRT is calculated by multiplying the detected air-fuel ratio-dependent coefficient KACT which has been calculated by the KACT calculating routine in the same manner as in the first embodiment by the above obtained exhaust gas recirculation rate KEGR, followed by terminating the program.

Thus, similarly to the first embodiment, the fuel injection amount is calculated based on the inert gas recirculation rate KEGRT calculated as above, by the use of the aforestated equation (1), whereby engine control can be carried out with high accuracy, based on the fuel injection amount which takes into account the dynamic delay of exhaust gases to be recirculated.

What is claimed is:

1. In a control system for an internal combustion engine having an intake system, and an exhaust system, including an exhaust gas recirculation passage extending between said intake system and said exhaust system, for recirculating part of exhaust gases emitted from said engine, an exhaust gas recirculation control valve for controlling a flow rate of exhaust gases to be recirculated through said exhaust gas recirculation passage, exhaust gas concentration-detecting means for detecting concentration of oxygen present in said exhaust gases, engine operating condition-detecting means for detecting operating conditions of said engine, and ignition timing advance value-calculating means for calculating an ignition timing advance value, based on operating conditions of said engine detected by said engine operating condition-detecting means, the improvement comprising:

dynamic characteristic-determining means for determining dynamic characteristics of said exhaust gases to be recirculated, based on operating conditions of said engine detected by said engine operating condition-detecting means;

virtual operation amount-calculating means for calculating a virtual operation amount of said exhaust gas recirculation control valve, based on the dynamic characteristics determined by said dynamic characteristic-determining means;

exhaust gas recirculation rate-calculating means for calculating a recirculation rate of said exhaust gases, based on the virtual operation amount calculated by said virtual operation amount-calculating means, and operating conditions of said engine detected by said engine operating condition-detecting means;

inert gas recirculation rate-calculating means for calculating a recirculation rate of inert gases present in exhaust gases to be recirculated, based on the exhaust gas recirculation rate calculated by said exhaust gas recirculation rate-calculating means, and the concentration of oxygen present in said exhaust gases detected by said exhaust gas concentration-detecting means; and advance correction value-calculating means for calculating an ignition timing advance correction, based on operating conditions of said engine detected by said engine operating condition-detecting means and the inert gas recirculation rate calculated by said inert gas recirculation rate-calculating means; and ignition timing advance value-correcting means for correcting said ignition timing advance value, based on the ignition timing advance correction value calculated by said advance correction value-calculating means.

2. In a control system for an internal combustion engine having an intake system, and an exhaust system, including an exhaust gas recirculation passage extending between said intake system and said exhaust system, for recirculating part of exhaust gases emitted from said engine, an exhaust gas recirculation control valve for controlling a flow rate of exhaust gases to be recirculated through said exhaust gas recirculation passage, valve operating condition-detecting means for detecting operating conditions of said exhaust gas recirculation control valve, exhaust gas concentration-detecting means for detecting concentration of oxygen present in said exhaust gases, engine operating condition-detecting means for detecting operating conditions of said engine including rotational speed of said engine and load on said engine, and fuel injection amount-calculating means for calculating an amount of fuel to be injected, based on operating conditions of said engine detected by said engine operating condition-detecting means, the improvement comprising:

dynamic characteristic-determining means for determining dynamic characteristics of said exhaust gases to be recirculated, based on operating conditions of said engine detected by said engine operating condition-detecting means;

virtual operation amount-calculating means for calculating a virtual operation amount of said exhaust gas recirculation control valve, based on the dynamic characteristics determined by said dynamic characteristic-determining means;

exhaust gas recirculation rate-calculating means for calculating a recirculation rate of said exhaust gases, based on the virtual operation amount calculated by said virtual operation amount-calculating means and operating conditions of said engine detected by said engine operating condition-detecting means;

inert gas recirculation rate-calculating means for calculating a recirculation rate of inert gases present in said exhaust gases to be recirculated through said exhaust gas recirculation passage, based on the exhaust gas recirculation rate calculated by said exhaust gas recirculation rate-calculating means and the concentration of oxygen present in said exhaust gases detected by said exhaust gas concentration-detecting means; and fuel injection amount-correcting means for correcting the amount of said fuel to be injected, based on the inert gas recirculation rate calculated by said inert gas recirculation rate-calculating means.

3. A control system as claimed in claim 2, wherein said dynamic characteristic-determining means calculates a time lag coefficient indicative of the dynamic characteristics of said exhaust gases to be recirculated through said exhaust gas recirculation passage, based on the load on said engine in a manner such that said time lag coefficient is set to a larger value as the load on said engine is larger.

4. A control system as claimed in claim 2, including ignition timing advance value-calculating means for calculating an ignition timing advance value, based on operating conditions of said engine detected by said engine-operating condition-detecting means, advance correction value-calculating means for calculating an ignition timing advance correction value, based on operating conditions of said engine detected by said engine operating condition-detecting means and the inert gas recirculation rate calculated by said inert gas recirculation rate-calculating means, and ignition timing advance value-correcting means for correcting said ignition timing advance value, based on the ignition timing advance correction value calculated by said advance correction value-calculating means.

5. A control system as claimed in claim 4, wherein said engine includes intake valves, exhaust valves, and valve timing-changing means for controlling valve timing of at least one of said intake valves and said exhaust valves, said advance correction value-calculating means calculating said ignition timing advance correction value, based on the valve timing controlled by said valve timing-changing means.

6. A control system as claimed in claim 2, wherein said exhaust gas recirculation rate-calculating means calculates an amount of said exhaust gases to be recirculated, based on the virtual operation amount calculated by said virtual operation amount-calculating means, and a maximum amount of said exhaust gases to be recirculated, based on operating conditions of said engine detected by said engine operating condition-detecting means, to thereby calculate said exhaust gas recirculation rate, based on the amount of said exhaust gases to be recirculated and the maximum amount of said exhaust gases to be recirculated.

7. A control system as claimed in claim 2, including corrected virtual operation amount-calculating means for calculating a corrected virtual operation amount, based on the rotational speed of said engine detected by said operating condition-detecting means, and wherein said exhaust gas recirculation rate-calculating means calculates said exhaust gas recirculation rate, based on the corrected virtual operation amount and the load on said engine detected by said engine operating condition-detecting means.

8. A control system as claimed in any of claims 2, 6 or 7, wherein said engine includes intake valves, exhaust valves, and valve timing-changing means for controlling valve timing of at least one of said intake valves and said exhaust valves, said exhaust gas recirculation rate-calculating means calculating said exhaust gas recirculation rate, based on the valve timing controlled by said valve timing-changing means.

* * * * *